(12) United States Patent
Yamanaka

(10) Patent No.: US 6,625,783 B2
(45) Date of Patent: Sep. 23, 2003

(54) STATE MACHINE, SEMICONDUCTOR DEVICE USING STATE MACHINE, AND METHOD OF DESIGN THEREOF

(75) Inventor: Kei Yamanaka, Fukuoka (JP)

(73) Assignee: Logic Research Co., Ltd., Fukuoka (JP)

( * ) Notice: Subject to any disclaimer, the term of this patent is extended or adjusted under 35 U.S.C. 154(b) by 56 days.

(21) Appl. No.: 09/958,753

(22) PCT Filed: Feb. 14, 2001

(86) PCT No.: PCT/JP01/01051

§ 371 (c)(1),
(2), (4) Date: Oct. 10, 2001

(87) PCT Pub. No.: WO01/61464

PCT Pub. Date: Aug. 23, 2001

(65) Prior Publication Data

US 2002/0161455 A1 Oct. 31, 2002

(30) Foreign Application Priority Data

Feb. 16, 2000 (JP) .......................... 2000-038867

(51) Int. Cl.⁷ .................. G06F 17/50; G06F 15/177; G06F 9/02; G06F 9/06; H03K 19/173
(52) U.S. Cl. .................. 716/3; 716/16; 716/18; 713/2; 713/100; 703/16; 703/20; 326/38; 326/46; 712/220
(58) Field of Search .................. 716/3, 16, 18; 713/2, 100; 703/16, 20; 326/38, 46; 712/220

(56) References Cited

U.S. PATENT DOCUMENTS

| | | | | |
|---|---|---|---|---|
| 5,025,458 A | * | 6/1991 | Casper et al. .................. 702/66 |
| 5,163,016 A | * | 11/1992 | Har'El et al. .................. 716/5 |
| 5,383,143 A | * | 1/1995 | Crouch et al. .................. 708/254 |
| 5,386,583 A | * | 1/1995 | Hendricks .................. 707/7 |
| 5,537,580 A | * | 7/1996 | Giomi et al. .................. 716/19 |
| 5,539,680 A | * | 7/1996 | Palnitkar et al. .................. 703/13 |
| 5,666,516 A | * | 9/1997 | Combs .................. 711/163 |
| 6,003,107 A | * | 12/1999 | Ranson et al. .................. 710/316 |
| 6,003,150 A | * | 12/1999 | Stroud et al. .................. 714/725 |
| 6,065,089 A | * | 5/2000 | Hickerson et al. .................. 710/266 |
| 6,088,795 A | * | 7/2000 | Vorbach et al. .................. 713/100 |
| 6,105,087 A | * | 8/2000 | Rivoir .................. 710/100 |
| 6,108,887 A | * | 8/2000 | Ponamgi et al. .................. 29/407.01 |
| 6,154,048 A | * | 11/2000 | Iwanczuk et al. .................. 326/38 |
| 6,173,243 B1 | * | 1/2001 | Lowe et al. .................. 703/14 |
| 6,182,247 B1 | * | 1/2001 | Herrmann et al. .................. 703/17 |
| 6,212,625 B1 | * | 4/2001 | Russell .................. 712/217 |
| 6,212,629 B1 | * | 4/2001 | McFarland et al. .................. 712/241 |
| 6,216,224 B1 | * | 4/2001 | Klein .................. 713/1 |
| 6,260,065 B1 | * | 7/2001 | Leiba et al. .................. 709/224 |
| 6,272,588 B1 | * | 8/2001 | Johnston et al. .................. 703/17 |
| 6,304,903 B1 | * | 10/2001 | Ward .................. 709/224 |
| 6,321,366 B1 | * | 11/2001 | Tseng et al. .................. 716/6 |
| 6,330,702 B1 | * | 12/2001 | King .................. 708/130 |
| 6,349,388 B1 | * | 2/2002 | Russell .................. 703/28 |
| 6,470,285 B1 | * | 10/2002 | Atwell .................. 714/30 |
| 6,501,761 B1 | * | 12/2002 | Pannell et al. .................. 370/403 |
| 6,546,505 B1 | * | 4/2003 | Swoboda et al. .................. 714/30 |
| 2002/0152060 A1 | * | 10/2002 | Tseng .................. 709/219 |

* cited by examiner

Primary Examiner—Matthew Smith
Assistant Examiner—Phallaka Kik
(74) Attorney, Agent, or Firm—Jordan and Hamburg LLP

(57) ABSTRACT

A flexible and reliable state machine and a semiconductor device using the state machine are provided. A state machine includes a memory circuit (1), a comparator circuit (2), an analyzer circuit (3) and an arithmetic circuit (4). The memory circuit (1) receives and holds data (5-1a) indicative of the next state, and outputs it as data (5-1b) indicative of present state. The comparator circuit (2) compares the date (5-2a) indicative of the present or next state and generates a state flag (6-2b). The analyzer circuit (3) decodes a state flag (6-3a) and generates the control signal (7-3b) for controlling operation of the arithmetic circuit (4). Based on a control signal (7-4a), the arithmetic circuit (4) operates on the data (5-4a) indicative of the present state and generates data (5-4b) indicative of the next state.

3 Claims, 7 Drawing Sheets

STATE MACHINE, SEMICONDUCTOR DEVICE USING STATE MACHINE, AND METHOD OF DESIGN THEREOF

TECHNICAL FIELD

The present invention relates to a semiconductor device and, more specifically, to a so-called state machine in which a mathematical model is expressed as a circuit on an LSI as well as a semiconductor device using the state machine and a method of design of thereof.

BACKGROUND ART

The recent rapid progress in electronics technologies has brought about remarkable development in fields such as networks and computers. A large variety of application technologies which had never been imagined in the past have been developed and, as a result thereof, numerous new products have come about.

Since the invention of the transistor in 1947, an IC (integrated circuit) used in every field of electronics has made great progress during this half of the century.

IC technology has developed since the invention of the IC by Kilby of Texas Instruments Incorporated in the U.S. and after the times of the standard logic IC, has shifted to the LSI (large scale IC), and further to the ASIC (application specific IC) represented by a gate array and a standard cell.

Due to the complicated and advanced functions required for recent integrated circuits, time needed for development of the circuits tends to be prolonged. In a gate array and a standard cell, however, basic cells which are prepared and registered by an IC manufacturer in advance are arrayed according to predetermined rules, and a unique logic circuit can be formed simply by changing a wiring step, thereby shortening time for logic design.

On the other hand, two kinds of so-called state machines have been developed which express mathematical models on LSIs:

(1) A state machine which basically consists of a counter, and
(2) A state machine which basically consists of random logic.

The conventional state machine basically consisting of a counter has the following characteristics:

(a) The regular state transition makes the circuit simple, which leads to easier design and inspection.
(b) The regular state transition enables an operator to readily take measures in case of damage (working failure) and makes the machine highly reliable.
(c) The regular state transition leads to a simple circuit, which makes a critical path shorter, resulting in high speed performance.
(d) The state transition depends on the kinds of counters used such as binary, gray code, Johnson and one hot, which leads to lower flexibility.

The conventional state machine basically consisting of random logic has the following characteristics:

(a) The irregular state transition makes the circuit complicated, which leads to difficulties with design and inspection.
(b) The irregular state transition disables an operator to readily take measures in case of damage (working failure) and makes the machine unreliable.
(c) The irregular state transition leads to a complicated circuit, which makes a critical path longer, resulting in low speed performance.
(d) A designer can freely establish the state transition of the state machine, which leads to high flexibility.

On the other hand, the conventional designing method for semiconductor devices comprises the two steps: a function designing step and a logic designing step. The function designing step includes function design, function division, and making of operation models. The function division means to divide the whole system into some units (circuits). When dividing, the system should be divided into appropriate units (circuits) taking into account the performance and specifications required.

In the conventional designing method, however, the function division, which has no particular method, depends on each designer's techniques and experience, and results of division very from designers to designers. Therefore, there is no unity in dividing a system, thereby lowering the readability of the whole system after division and also making the performance thereof inconsistent.

DISCLOSURE OF THE INVENTION

The first object of the present invention is to provide a state machine which solves each of the problems of the above-described conventional state machines, has higher flexibility compared to the state machines basically consisting of counters, and also has a simpler structure and higher reliability compared to the state machines basically consisting of random logic, as well as to provide a semiconductor device using the state machine.

The second object of the present invention is to provide a method of design of a semiconductor device which uses the above state machine, is capable of providing the division of the system with unity and, consequently, enables the whole system after division to have higher readability with more consistency in performance.

In order to attain the above first object, the state machine of the present invention is a state machine comprising a memory circuit for holding a present state and a circuit for generating a next state, wherein the circuit for generating the next state has at least two circuits selected from an analyzer circuit, an arithmetic circuit and a comparator circuit, said circuits being connected to each other maintaining independency of each circuit.

In principle, the connection maintaining independency is made between the inputs and outputs of the circuits of which signals have the same property.

The memory circuit, comparator circuit, analyzer circuit and arithmetic circuit can be connected using a software means or hardware means in optional combination and order.

The most remarkable feature of the present invention is that a state machine is constructed by connecting the circuits while maintaining independency of each of the circuits. By this structure, the present invention has solved the problem lying in the conventional state machines, that is, the more complicated the state transition is, the more complicated the structure and operation of the circuit for generating the next state are, which leads to difficulties in designing. Namely, any state machine which performs any state transition can be realized with the simple structure of circuits and operation. Thus, such advantages as shorter time for designing, higher reliability of the circuit and reuse of designing assets can be obtained.

In this description, the connection while maintaining independency of the circuits means the state where each circuit has its own distinct role (or function division) independently. As a particular method of connection, it can be realized by connecting the above circuits so that the signals of the circuits have the same property.

In order to attain the above second object, the function design and logic design of a semiconductor device are performed incorporating the above-described state machine.

The present invention exhibits the following effects:

(1) The analyzer circuit, the arithmetic circuit and the comparator circuit which constitute the state machine are connected so that only the signals having the same property are connected while maintaining independency of each of the circuits. Thus, the present invention realized any state machine which can perform any state transition by simple structure and operation of the circuit, and has solved the following conventional problems: the more complicated the state transition is, the more complicated the structure and operation of the circuit for generating the next state are, which leads to difficult designing; and the state machine with a simple structure has difficulties in realizing a flexible state transition. Accordingly, the present invention can provide a state machine which has higher flexibility compared to the state machine basically consisting of a counter and also is highly reliable with a simpler structure compared to the state machine basically consisting of a random logic.

(2) Each analyzer circuit, the arithmetic circuit and the comparator circuit is structured to have a single function respectively. Therefore, defective designing, erroneous connection, and change in property of the signal of each circuit can be prevented.

(3) A semiconductor device in which the state machine of the present invention is incorporated has a simple and clear structure, which can realize a high-speed circuit and higher reliability.

(4) According to the method of design for incorporating the state machine of the present invention to a semiconductor device, the performance of the system can be precisely estimated at an early stage of designing the semiconductor device, thereby preventing repetition of design and shortening time for design.

BEST MODE FOR CARRYING OUT THE INVENTION

Figure 1:
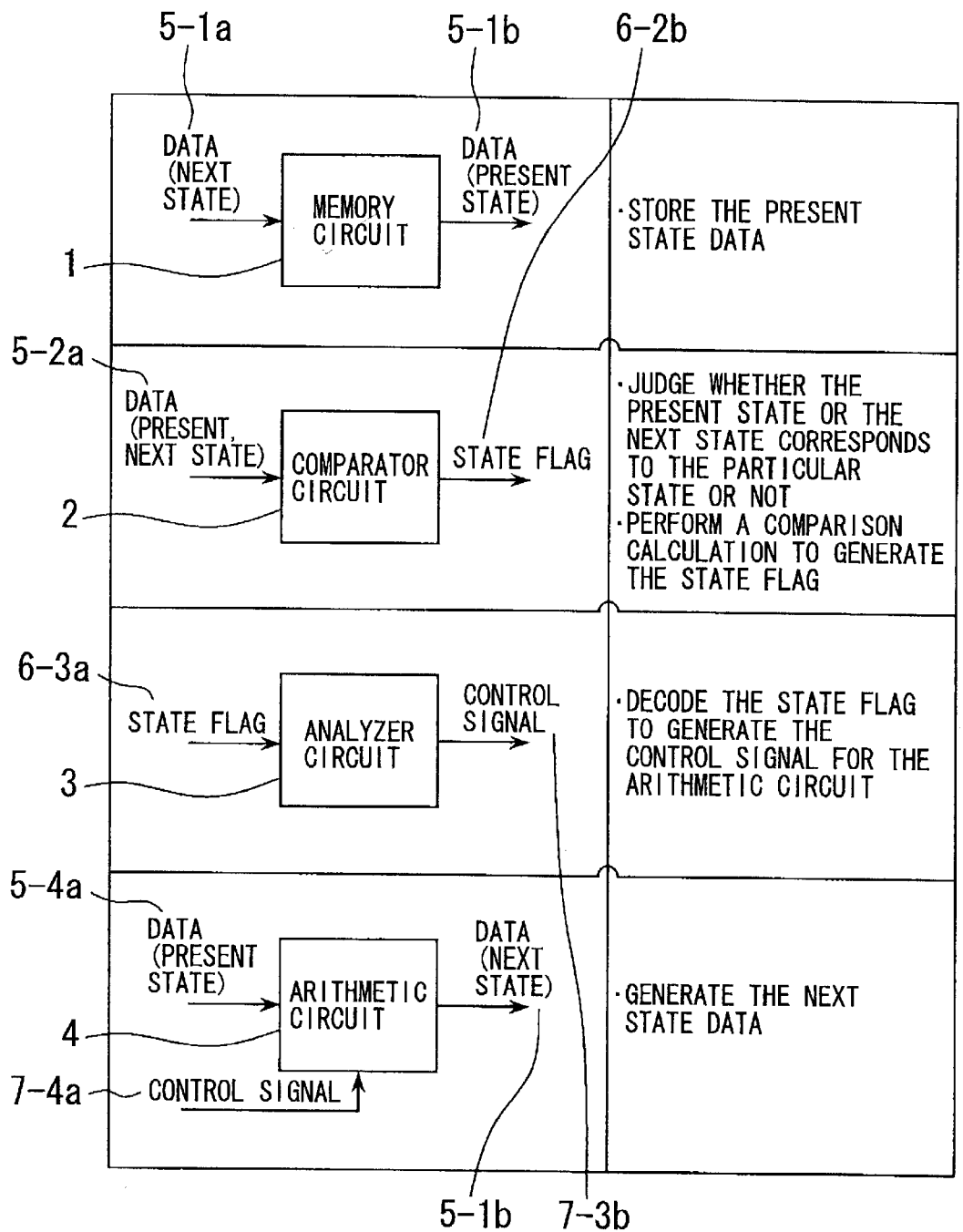
FIG. 1 is an explanatory view showing a principle for connecting each circuit in a state machine according to the present invention.

Referring to FIG. 1, explained is an example in the case where four kinds of circuits: a memory circuit 1, a comparator circuit 2, an analyzer circuit 3 and an arithmetic circuit 4 are connected. An input signal and output signal of each of the four kinds of circuits have respective properties, which include three properties: a data 5 (5-1a, 5-1b, 5-2a, 5-4a and 5-4b), a state flag 6 (6-2b and 6-3a), and a control signal 7 (7-3b and 74a).

The memory circuit 1 holds a present state data of a state machine, and the comparator circuit 2 performs a comparison calculation to judge whether the present state data or a next state data corresponds to a particular state or not. The analyzer circuit 3 controls calculation performed in the arithmetic circuit 4, and the arithmetic circuit 4 generates the next state data from the present state data of the state machine by calculation. The data 5 indicates the present state data and the next state data of the state machine, and the state flag 6 indicates whether the state data of the state machine corresponds to the particular data or not. The control signal 7 indicates the kind of calculation which is performed when generating the next state data.

The memory circuit 1 which stores the data 5 indicating the present state has the property of the data 5 for both input and output, and judges that the present state data or the next state data corresponds to the particular state. The comparator circuit 2 has the property of the data 5 for input and the property of the state flag 6 for output. The analyzer circuit 3 which decodes the state flag 6 and generates the control signal 7 for the arithmetic circuit has the property of the state flag 6 for input and the property of the control signal 7 for output. The arithmetic circuit 4 which generates the date 5 indicating the next state has the property of the data 5 for both input and output.

The memory circuit 1 inputs and holds the data 5 indicating the next state and outputs it as the data 5 indicating the present state. The comparator circuit 2 performs comparison calculation to the data 5 indicating the present or next state and generates the state flag 6. The analyzer circuit 3 decodes the state flag 6 and generates the control signal 7 for controlling operation of the arithmetic circuit 4. The arithmetic circuit 4 performs calculation to the data 5 indicating the present state based on the control signal 7 and generates the data 5 indicating the data 5.

In the state machine of the present invention, as described above, the circuits which have the same property, for example, the state data which is the output of the memory circuit 1 and the state data which is the input of the comparator circuit 2, are connected in principle. Accordingly, the circuits can be connected while maintaining the independency of each of the circuits, thereby realizing a state machine with a simple and clear structure.

Next, explained is an example of connection between the circuits in the state machine of the present invention.

1. First Example of Connection (in the case that the present state data stored in the memory circuit 1 is renewed as a new next state data and then stored in the memory circuit 1)

In the structure shown in FIG. 1, the output of the memory circuit 1 is connected to the input of the comparator circuit 2. The comparator circuit 2 judges whether the present state data 5-1b which is the output of the memory circuit 1 corresponds to the particular state or not, and generates and outputs the state flag 6-2b. Next, the output of the comparator circuit 2 and the input of the analyzer circuit 3 are connected to each other. The analyzer circuit 3 decodes the state flag 6-3a, and generates and outputs the control signal 7-3b for the arithmetic circuit 4. Next, the output of the analyzer circuit 3 and the output of the memory circuit 1 are connected to the input of the arithmetic circuit 4. The present state data 5-4a is processed based on the control signal 74a, and the new data 54b is generated and outputted. Finally, the output of the arithmetic circuit 4 is connected to the input of the memory circuit 1, and the new data (next data) 5-1a which is inputted from the arithmetic circuit 4 is held in the memory circuit 1 and outputted.

2. Second Example of Connection (in the case that the present state data is inputted in the comparator circuit 2 and the state flag based on the new next state data is outputted)

The output of the comparator circuit 2 is connected to the input of the analyzer circuit 3. The analyzer circuit 3 generates and outputs the control signal 7-3b based on the state flag 6-3a. Next, the output of the analyzer circuit 3 and the output of the memory circuit 1 are connected to the arithmetic circuit 4. The arithmetic circuit 4 processed the data 5-4a based on the control signal 74a, and generates and outputs the new data 5-4b. Finally, the output of the arithmetic circuit 4 is connected to the input of the memory circuit 1, and the memory circuit 1 holds and outputs the new data 5-1a inputted from the arithmetic circuit 4. Simultaneously, the output of the memory circuit 1 is connected to the input of the comparator circuit 2. The comparator circuit 2 generates and holds the state flag 6-2b based on the data 5-2a and outputs it.

Although two examples are illustrated above, the present invention is not defined to them. The input and output of the circuits can optionally be combined so as to generate, hold and output any desired output signals.

Use of the state machine having the above-described structure enables the machine to be applicable for any fields of semiconductor devices. In particular, the state machine can also be applied to the so-called programmable semiconductor device of which functions can be altered through the program operation from outside, as being disclosed by the present inventor in Japanese Unexamined Patent Publication No. Hei 10-91216.

The basic functions of the analyzer circuit 3, the arithmetic circuit 4 and the comparator circuit 2 are: (1) to decode the state flag 6 and generate the control signal 7 for the arithmetic circuit 4, (2) to generate the data 5 indicating the next state, and (3) to judge if the present state or the next state corresponds to the particular state, respectively. A part of the basic function of the analyzer circuit 3 may be added to the arithmetic circuit 4 or the comparator circuit 2. However, in view of the prevention of defective designing, erroneous connection, and change in property of the signal of each circuit, the circuits should preferably have a single function each.

Since the basic constituent of the present invention is the state machine as described above, the function division in the process of function designing does not rely on the experience of a designer and can be divided as a state machine. Thus, the division of the system has unity, thereby providing a method of design of the semiconductor device with high readability of the whole system after division and consistent performance.

EXAMPLE 1

The features of the present invention will be explained below referring to the examples shown in FIGS. 2 to 5.

Figure 2:
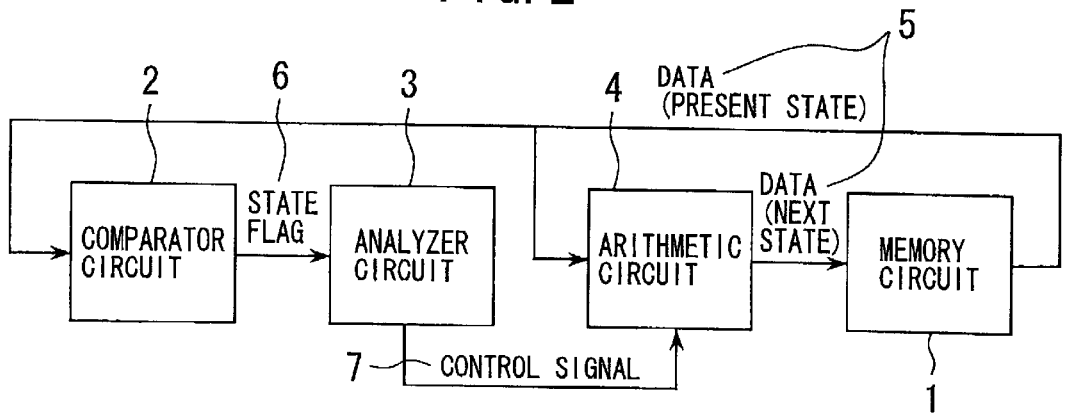
FIG. 2 is a block diagram illustrating a structure of a state machine of the first embodiment.
Figure 3:
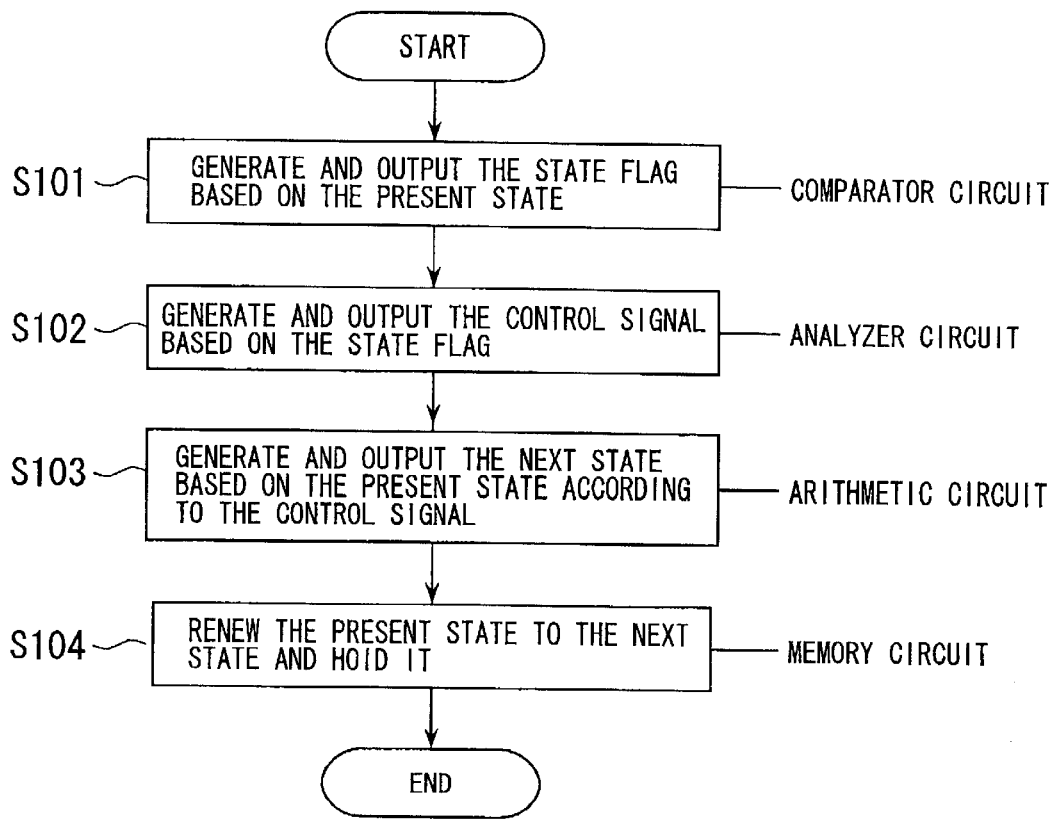
FIG. 3 is a flow chart illustrating a process flow of the state machine shown in FIG. 2.
Figure 4:
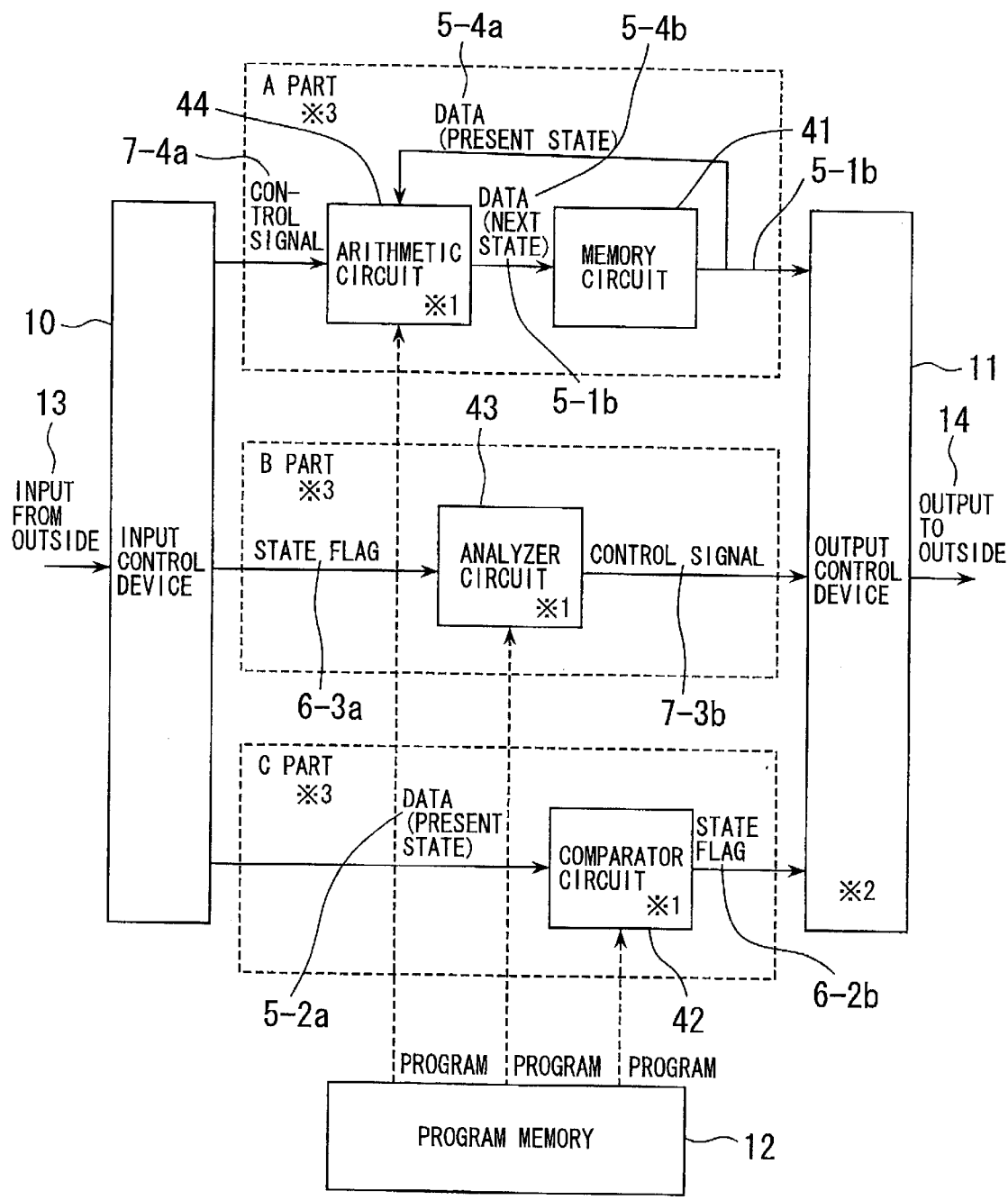
FIG. 4 is a block diagram illustrating a structure of a semiconductor device including the state machine shown in FIG. 2.
Figure 5:
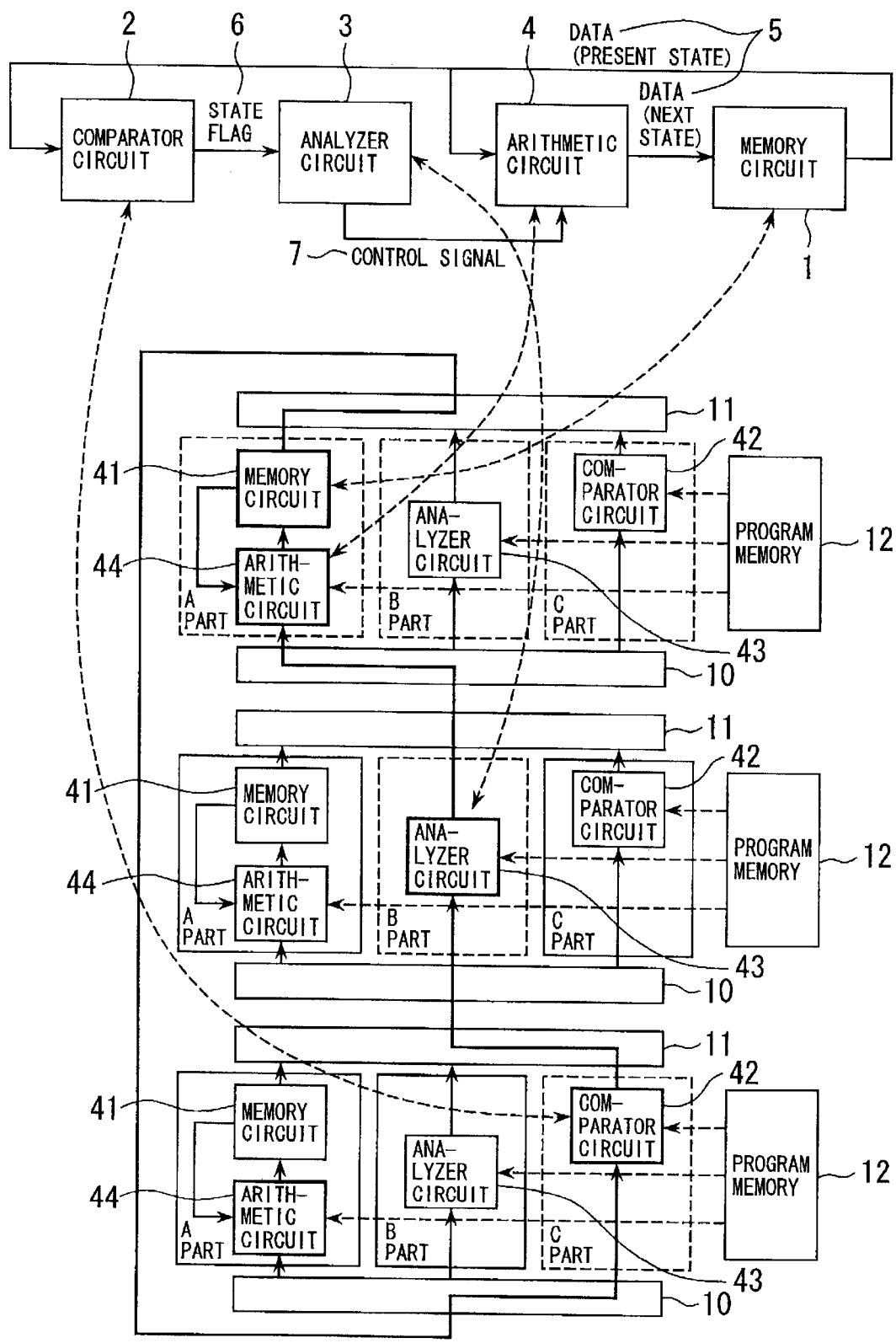
FIG. 5 is a view for explaining responses of the state machine of FIG. 2 and the state machine in the semiconductor device of FIG. 4.

FIG. 2 is a block diagram illustrating a structure of a state machine in the example 1; FIG. 3 is a flow chart illustrating a process flow of the state machine shown in FIG. 2; FIG. 4 is a block diagram illustrating a structure of a semiconductor device including the state machine in FIG. 2; and FIG. 5 is a view for explaining responses of the state machine shown in FIG. 2 and the state machine in the semiconductor device shown in FIG. 4.

Referring to FIGS. 2 and 3, the state machine of this example comprises the comparator circuit 2, the analyzer circuit 3, the arithmetic circuit 4 and the memory circuit 1. The output of the memory circuit 1 is connected to the input of the comparator circuit 2; the output of the comparator circuit 2 is connected to the input of the analyzer circuit 3; the output of the analyzer circuit 3 and the output of the memory circuit 1 are connected to the input of the arithmetic circuit 4; and the output of the arithmetic circuit 4 is connected to the input of the memory circuit 1.

The process flow of the state machine of the Example 1 is as follows. The comparator circuit 2 generates and outputs the state flag 6-2b based on the data 5-2a (S101 in FIG. 3); the comparator circuit 3 generates and outputs the control signal 7-3b based on the state flag 6-3a (S102); the arithmetic circuit 4 processes the data 5-4a based on the control signal 7-4a, and generates and outputs the new data 54b (S103); and the memory circuit 1 holds and outputs the new data 5-1a inputted from the arithmetic circuit 4 (S104).

The process required for generating the next state is divided into judgment of the state, generation of the control signal, and processing of the state by this state machine, and each of the processes is assigned to the comparator circuit 2, the analyzer circuit 3 and the arithmetic circuit 4 to distinguish the role of the whole circuit. By this structure, a state machine having a different function can be realized simply by changing or adding the function of the circuit which corresponds to the different function.

For example, the arithmetic circuit 4 of the state machine which performs state transition by counting up the data may only have the incremental function. For realizing the state machine which performs the opposite state transition by counting down the data, it is sufficient to add the decremental function to the arithmetic circuit 4 of the above state machine.

Thus, the processing capability of each circuit covers wide ranges to enable any state transition, thereby providing a general-purpose state machine with the functions which have not been realized in the conventional state machines.

Next, referring to FIG. 4, explained below is the semiconductor device including the state machine shown in FIG. 2.

(Whole System)

The semiconductor device of FIG. 4 comprises Part A including an arithmetic circuit 44 and a memory circuit 41, Part B including an analyzer circuit 43, Part C including a comparator circuit 42, each circuit of an input control device 10 and an output control device 11, and a program memory 12.

(Each Part)

The arithmetic circuit 44 in Part A includes a plurality of calculators which have functions such as increment and decrement, addition and subtraction, arithmetic, and logical shift, and decides which calculation is to be performed by a calculation command from outside and the control signal 7.

The memory circuit 41 in Part A, which includes a register only, holds the data 5 inputted from outside for one clock and inputs it. The analyzer circuit 43 in Part B, which includes an address decoder and a selector, decodes the state flag 6 as an address, and extracts and outputs the data 5 of the corresponding address (result of the analysis) from the program memory 12. The comparator circuit 42 in Part C, which includes a comparator for judging the relationship of <, > and =, judges the stage of the data 5 based on a comparison command inputted from outside and a comparison value.

The input control device 10 controls to which part among A, B or C an input 13 from outside is sent. The output control device 11 controls which output among the outputs of Part A, B or C is outputted. The program memory 12 inputs the calculation commend or the result of analysis, or the comparison command and the comparison value into the arithmetic circuit 44 or the analyzer circuit 43 or the comparator circuit 42.

(Process Flow)

This semiconductor device can make only one part among Parts A to C effective at the same time. When Part A is effective, the input 13 from outside is first outputted as the control signal 74a by the circuit of the input control device 10 to the arithmetic circuit 44. Next, the arithmetic circuit 44 processes the data 5-4a inputted from the memory circuit 41 on the basis of the inputted control signal 74a and the calculation command inputted from the program memory 12, and outputs the new data 5-4b. Then, the memory circuit 41 holds the new data 54b outputted from the arithmetic circuit 4 for one clock and outputs it. Finally, the circuit of the output control device 11 outputs the data 5-1b taken out from the memory circuit 41 to outside.

When Part B is effective, the input 13 from outside is first outputted as the state flag 6-3a by the circuit of the input control device 10 to the analyzer circuit 43. Next, with the inputted state flag 6-3a as the address, the analyzer circuit 43 extracts the data of the corresponding address (result of the analysis) from the program memory 12, and outputs the control signal 7-3b. Finally, the circuit of the output control device 11 outputs the control signal 7-3b from the analyzer circuit 44 to the outside.

When Part C is effective, the input 13 from outside is first outputted as the data 5-2a by the circuit of the input control device 10 to the comparator circuit 42. Next, the comparator circuit 42 compares the inputted data 5-2a on the basis of the comparison command and the comparison value inputted from the program memory 12, and outputs the result of the judgment. Finally, the circuit of the output control device 11 outputs the state flag 6-2b from the comparator circuit 42 to the outside.

The semiconductor device of this embodiment, into which the state machine comprising the memory circuit, the programmable arithmetic circuit, the analyzer circuit and the comparator circuit are incorporated, is a general-purpose device which has excellent flexibility and can be easily reused compared to the semiconductor device with the conventional state machine.

Next, referring to FIG. 5, explained below is the relationship between the state machine shown in FIG. 2 and the state machine in the semiconductor device shown in FIG. 4.

The comparator circuit 2 on the left side of FIG. 2 corresponds to the programmable comparator circuit 43 in Part C in FIG. 4. The analyzer circuit 3 in FIG. 2 corresponds to the programmable analyzer circuit 42 in Part B in FIG. 4. The arithmetic circuit 4 in FIG. 2 corresponds to the programmable arithmetic circuit 44 in Part A in FIG. 4. The memory circuit 1 on the right side of FIG. 2 corresponds to the memory circuit 41 in Part A in FIG. 4.

When the state machine of FIG. 2 is realized by the semiconductor device of FIG. 4, as shown in FIG. 5, it is necessary to connect at least three of the semiconductor devices of FIG. 4. This is because the semiconductor device of FIG. 4 can use only one part of Parts A to C at the same time.

EXAMPLE 2

Figure 6:
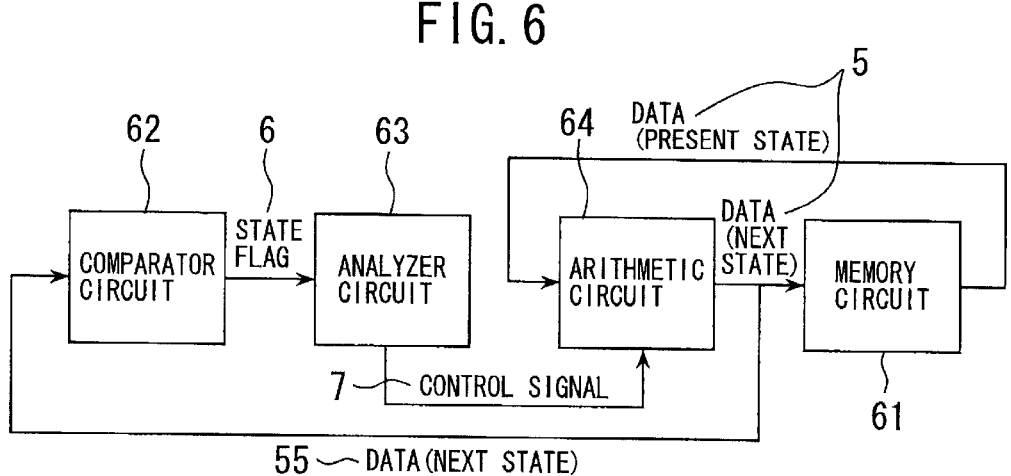
FIG. 6 is a block diagram illustrating a structure of a state machine of the second embodiment.
Figure 7:
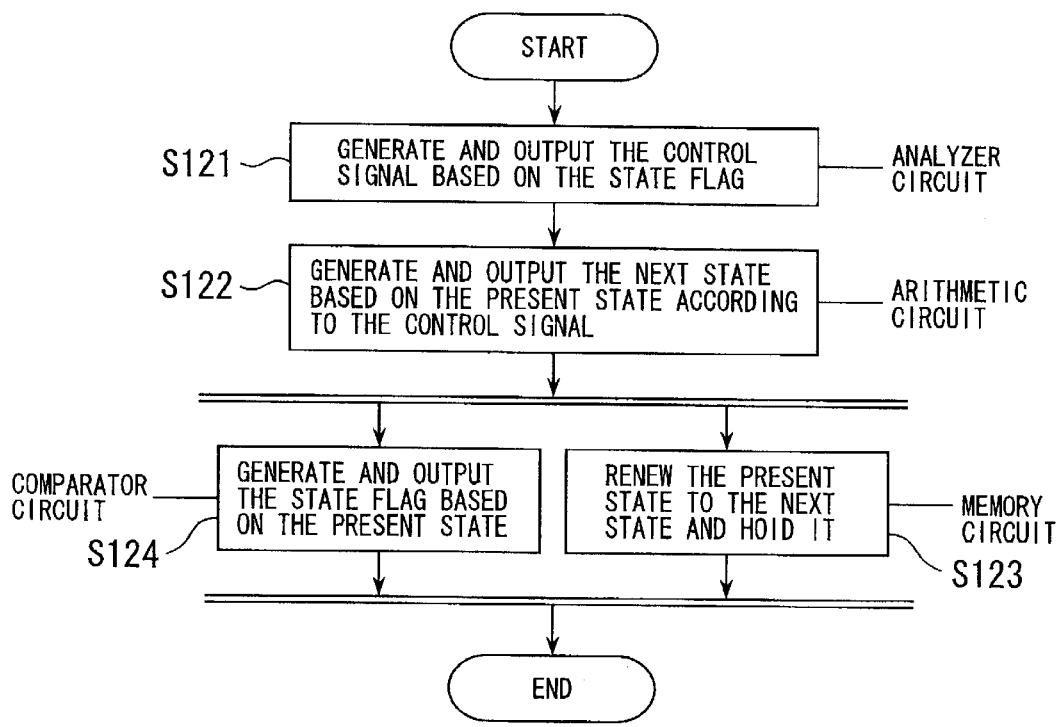
FIG. 7 is a flow chart illustrating a process flow of the state machine shown in FIG. 6.
Figure 8:
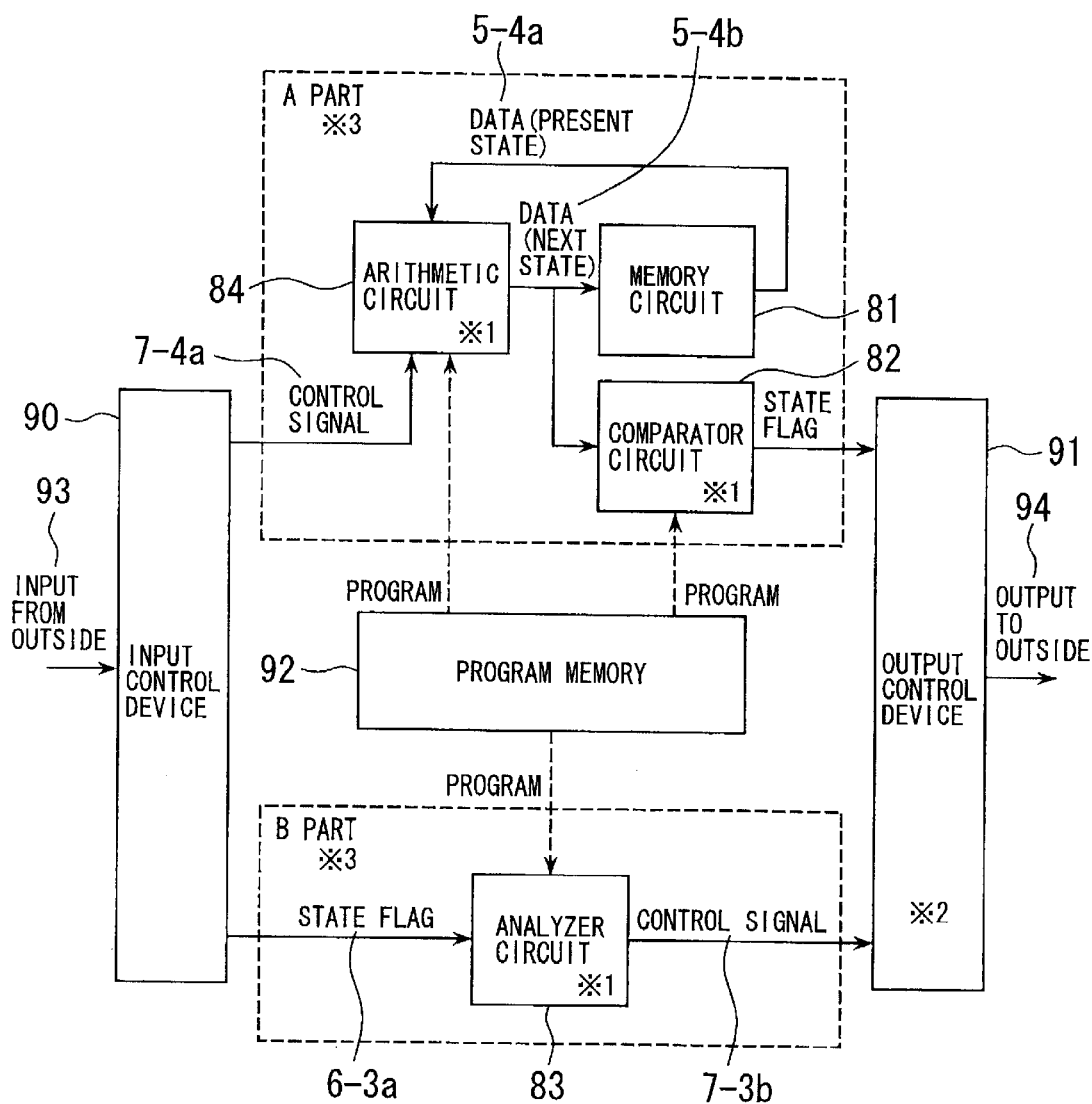
FIG. 8 is a block diagram illustrating a structure of a semiconductor device including the state machine shown in FIG. 6.
Figure 9:
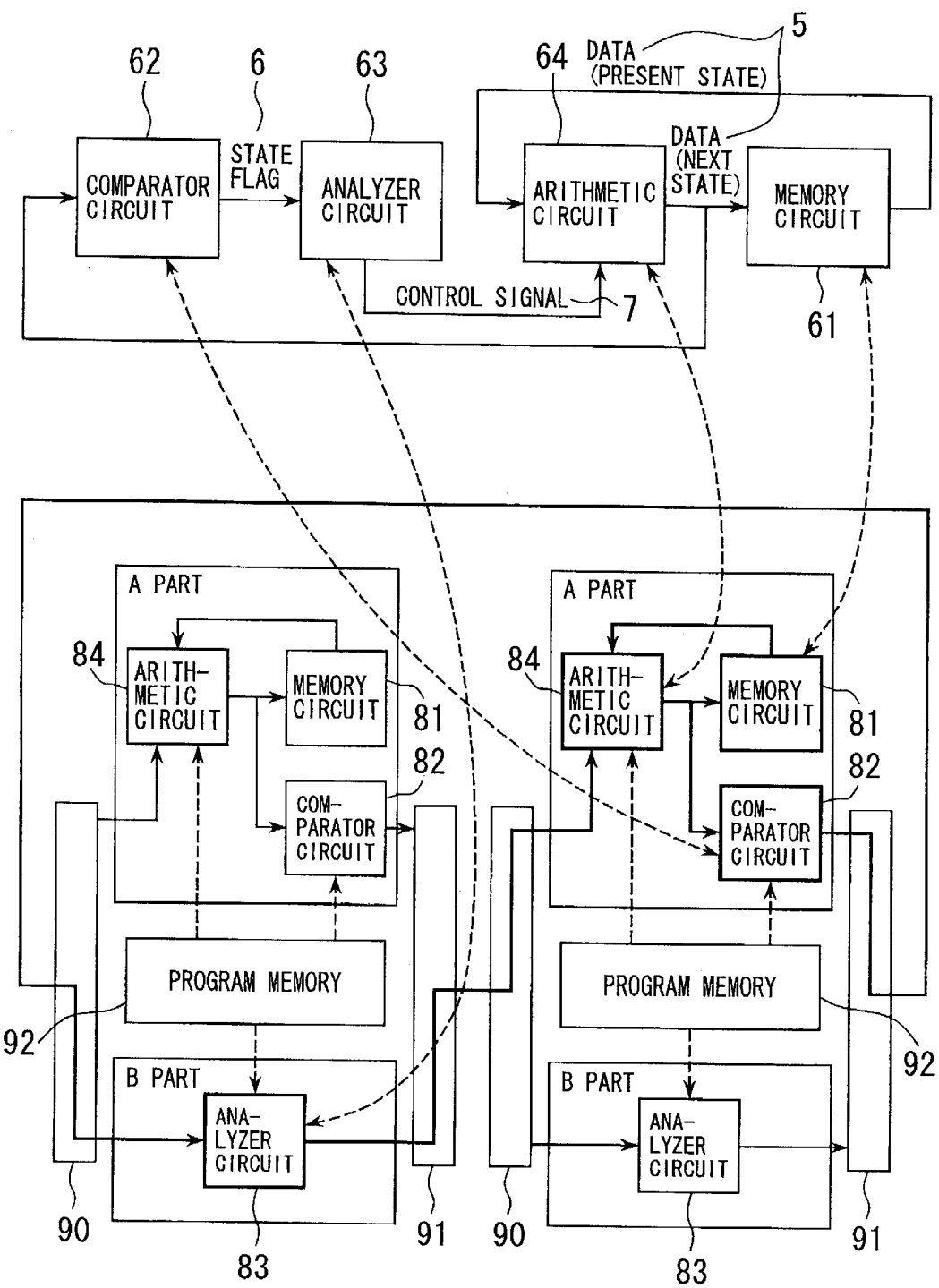
FIG. 9 is a view for explaining responses of the state machine of FIG. 6 and the state machine in the semiconductor device of FIG. 8.

Next, referring to FIGS. 6 to 9, Example 2 will be explained below. FIG. 6 is a block diagram illustrating a structure of a state machine of Example 2; FIG. 7 is a flow chart illustrating a process flow of the state machine shown in FIG. 6; FIG. 8 is a block diagram illustrating a structure of a semiconductor device including the state machine shown in FIG. 6; and FIG. 9 is a view for explaining responses of the state machine shown in FIG. 6 and the state machine in the semiconductor device shown in FIG. 8. The data inputted and outputted from each circuit, the state flags and the control signals are the same as those in Example 1.

Referring to FIG. 6, the state machine of this example comprises a comparator circuit 62, an analyzer circuit 63, an arithmetic circuit 64 and a memory circuit 61. The output of the comparator circuit 62 is connected to the input of the analyzer circuit 63; the output of the analyzer circuit 63 and the memory circuit 61 are connected to the input of the arithmetic circuit 64; and the output of the arithmetic circuit 64 is connected to the input of the memory circuit 61 and the comparator circuit 62.

The process flow according to the above structure is as follows. The analyzer circuit 63 generates and outputs the control signal 7-3b based on the state flag 6-3a (S121 in FIG. 7). The arithmetic circuit 64 processes the data 54a based on the control signal 7-4a, and generates and outputs the new data 5-4b (S122). The memory circuit 61 holds and outputs the new data 5-1a inputted from the arithmetic circuit 64 (S123). The comparator circuit 62 generates and holds the state flag 6-2b based on the data 5-2a, and outputs it (S124).

By this state machine, the process required for generating the next state is divided into judgment of the state, generation of the control signal and processing of the state, respectively, and each of the processes is respectively assigned to the comparator circuit 62, the analyzer circuit 63 and the arithmetic circuit 64 to distinguish the role of the whole circuit. Thus, a state machine having a different function can be realized simply by changing or adding the function of the circuit which corresponds to the different function.

For example, the arithmetic circuit 64 of the state machine which performs state transition by counting up the data may only have the incremental function. For realizing the state machine which performs opposite state transition by counting down the data, it is sufficient to add the decremental function to the arithmetic circuit 64 of the above state machine.

Accordingly, the wider range of processing capability by each circuit enables any state transition. Furthermore, the simultaneous processing of the memory circuit 61 and the comparator circuit 62 can shorten the process period of the state machine in total, thereby realizing the general-purpose state machine with the higher processing speed compared to Example 1 which has not been obtained by the conventional state.

Next, referring to FIG. 8, the semiconductor device including the state machine shown in FIG. 2.

(Whole System)

The semiconductor device of FIG. 8 comprises Part A including an arithmetic circuit 84, a memory circuit 81 and a comparator circuit 82, Part B including an analyzer circuit 83, each circuit of an input control device 90 and an output control device 91, and a program memory 92.

(Each Part)

The arithmetic circuit 84 in Part A includes a plurality of calculators which have functions such as increment and decrement, addition and subtraction, arithmetic, and logical shift, and decides which calculation is to be performed by a calculation command inputted from outside and the control signal 7. The memory circuit 81 in Part A, which includes a register only, holds the data 5 inputted from outside for one clock and inputs it. The comparator circuit 82 in Part A, which includes a comparator for judging the relationship of <, >and =, judges the state of the data 5 based on a comparison command inputted from outside and a comparison value. The analyzer circuit 83 in Part B, which includes an address decoder and a selector, decodes the state flag 6 as an address, and extracts and outputs the data 5 of the corresponding address (result of the analysis) from the program memory 92.

The input control device 90 controls to which part between A or B an input 93 from outside is sent.

The output control device 91 controls which output between the outputs of Parts A and B is outputted as the output 94 to outside.

The program memory 92 inputs the calculation commend or the result of analysis, or the comparison command and the comparison value into the arithmetic circuit 84 or the analyzer circuit 83 or the comparator circuit 82.

(Process Flow)

This semiconductor device can make only one part in Parts A and B effective at the same time.

When Part A is effective, the input 93 from outside is first outputted as the control signal 7-4a by the circuit of the input control device 90 to the arithmetic circuit 84. Next, the arithmetic circuit 84 processes the data 5-4a inputted from the memory circuit 81 on the basis of the inputted control signal 7-4a and the calculation command inputted from the program memory 92, and outputs the new data 54b. Then, the memory circuit 81 holds the new data 5-4b outputted from the arithmetic circuit 84 for one clock and outputs it. At the same time, the new data 5-4b outputted from the arithmetic circuit 84 is compared on the basis of the comparison command inputted from the program memory 92 and the comparison value, and holds the result of the judgment for one clock and outputs it. Finally, the circuit of the output control device 91 outputs the state flag 6-2b from the comparator circuit 82 to outside.

When Part B is effective, the input 93 from outside is first outputted as the state flag 6-3a by the circuit of the input control device 90 to the analyzer circuit 83. Next, with the inputted state flag 6-3a as the address, the analyzer circuit 83 extracts the data of the corresponding address (result of the analysis) from the program memory 92, and outputs it. Finally, the circuit of the output control device 91 outputs the control signal 7-3b from the analyzer circuit 83 to outside.

The semiconductor device of this embodiment, into which the state machine comprising the memory circuit, the programmable arithmetic circuit, the analyzer circuit and the comparator circuit are incorporated, is a general-purpose device which has excellent flexibility and can be easily reused compared to the semiconductor device with the conventional state machine. Furthermore, by connecting the output of the arithmetic circuit to the comparator circuit, the state machine has higher process speed compared to the state machine of Example 1.

Next, referring to FIG. 9, explained below is the relationship between the state machine shown in FIG. 6 and the state machine in the semiconductor device shown in FIG. 8.

The analyzer circuit 63 in FIG. 6 corresponds to the programmable analyzer circuit 83 in Part A in FIG. 8. The arithmetic circuit 64 in FIG. 6 corresponds to the programmable arithmetic circuit 84 in Part B in FIG. 8. The comparator circuit 62 in FIG. 6 corresponds to the programmable comparator circuit 82 in Part A in FIG. 8. The memory circuit 61 on the right side of FIG. 6 corresponds to the memory circuit 81 in Part A in FIG. 8.

When the state machine of FIG. 6 is realized by the semiconductor device of FIG. 8, as shown in FIG. 9, it is necessary to connect at least two of the semiconductor devices of FIG. 6. This is because the semiconductor device of FIG. 6 can use only one part of Parts A and B at the same time.

EXAMPLE 31

Explained below is a method of design of a semiconductor device using the above-described state machine.

A semiconductor device is designed by the steps of function design, function division, logic design and layout design in this order. In these steps, a system is divided into actually programmable units by the function division. A system should be divided so as to satisfy the performance required by the system in terms of speed, scale, etc. In conventional designing methods, however, without any particular methods for division, different designers may probably bring largely different results after function division. Therefore, function division must have been repeated until satisfying the desired performance, which leads to concern for lengthy period of time for designing.

Considering the above problem, in order to precisely estimate the performance of a system in an initial period of semiconductor design, function division is performed in each state machine as a basic unit. It should be noted here that the conventional state machines, because of the unclear definition of their structures and the difference in the performance depending on designers, are not proper as basic units for function division.

Next, the steps of the method of design according to the present invention are explained below referring to some examples. In the case of Example 1 described above:

(1) First, divide the processing to be realized per state.
(2) Decide the bit width required for a memory circuit from the scale of each state divided.
(3) Search the input (another state) required for altering the state, and decide the function, the bit width and number required for a comparator.
(4) Decide the scale and function of an analyzer circuit from the number of the comparator and the content processed by the state.
(5) Decide the function and the bit width of an arithmetic circuit from the bit width of the memory circuit and the content processed by the state.
(6) Finally, connect the state machines to each other to realize the desired processing.

In the case of Example 2 described above:
(1) First, divide the processing to be realized per state.
(2) Decide the bit width required for a memory circuit from the scale of each state divided.
(3) Search how the state is to be referred to in another state, and decide the function, the bit width and number required for a comparator.
(4) Decide the scale and function of an analyzer circuit from the number of the input from another state and the content processed by the state.
(5) Decide the function and the bit width of an arithmetic circuit from the bit width of the memory circuit and the content processed by the state.

(6) Finally, connect the state machines to each other to realize the desired processing.

As described above, according to the present invention, since the function of the state machine is clearly defined and the performance can be easily estimated, function division can be appropriately performed. Therefore, in the method of design of a semiconductor device using the state machine of the present invention, the function division in the function design process can be performed as a state machine without relying on the experience of designers as in conventional methods, which leads to unity in dividing the system. Consequently, by the present invention, provided is the method of design of the semiconductor devices which have high readability of the whole system after division and consistent performance.

Industrial Applicability

The present invention is applicable to the fields of design and manufacture of LSIs.

What is claimed is:

1. A state machine, corn rising a memory circuit for holding a present state and a circuit for generating a next state;

said circuit for generating the next state having at least two circuits selected from an analyzer circuit, an arithmetic circuit and a comparator circuit;

said circuits being connected to each other while maintaining independency of each of the circuits; and said state machine being provided with a software means for connecting the memory circuit, the comparator circuit, the analyzer circuit and the arithmetic circuit in an optional combination and order.

2. A state machine, comprising:

a memory circuit for holding a present state and a circuit for generating a next state;

said circuit for generating the next state having at least two circuits selected from an analyzer circuit, an arithmetic circuit and a comparator circuit;

said circuits being connected to each other while maintaining independency of each of the circuits; and said state machine being provided with a hardware means for connecting the memory circuit, the comparator circuit, the analyzer circuit and the arithmetic circuit in an optional combination and order.

3. The state machine according to any one of claims 1 and 2 wherein said connection While maintaining independency of each of the circuits is made between inputs and outputs of each of the circuits, and said inputs and outputs have a same property.

* * * * *